US008412817B1

(12) United States Patent
Bharathula

(10) Patent No.: US 8,412,817 B1
(45) Date of Patent: Apr. 2, 2013

(54) LOAD BALANCING VOICEMAIL SERVER SYSTEM

(75) Inventor: Madhu Bharathula, Somerset, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 226 days.

(21) Appl. No.: 13/036,543

(22) Filed: Feb. 28, 2011

(51) Int. Cl.
*G06F 15/16* (2006.01)
*H04M 1/725* (2006.01)
*H04M 3/42* (2006.01)

(52) U.S. Cl. ........ 709/224; 709/223; 709/206; 709/245; 709/229; 455/412.1; 455/414.2; 455/413; 455/445; 455/453; 379/201.04; 379/211.03; 379/88.13; 379/88.16; 379/67.1

(58) Field of Classification Search .................. 709/224, 709/223, 203, 205, 206, 226, 229, 245
See application file for complete search history.

(56) References Cited

U.S. PATENT DOCUMENTS

| 6,625,261 | B2 * | 9/2003 | Holtzberg | 379/88.23 |
| 7,117,244 | B2 * | 10/2006 | Florman et al. | 709/203 |
| 7,254,612 | B2 * | 8/2007 | Green et al. | 709/206 |
| 8,195,130 | B2 * | 6/2012 | Hao et al. | 455/412.1 |
| 2002/0110231 | A1 * | 8/2002 | O'Neal et al. | 379/201.01 |
| 2007/0066348 | A1 * | 3/2007 | Silverbrook et al. | 455/556.1 |
| 2009/0279676 | A1 * | 11/2009 | Zazza | 379/88.17 |

* cited by examiner

*Primary Examiner* — Jude Jean Gilles

(57) ABSTRACT

A load balancing server system balances the load imposed by requestor requests for services across a set of service-providing servers. A network interface receives the requestor requests from a network communication system and sends server requests for services to the service-providing servers. A data processing system creates and maintains server status information indicative of whether each service-providing server is operational, and server pointer information identifying the service-providing server to which the next server request should be sent. In response to each requestor request, the data processing system causes the network interface to send one or more server requests for one or more services related to the requestor request to the service-providing server identified by the server pointer information and increments in a round-robin manner the server pointer information to the next operational service-providing server.

20 Claims, 5 Drawing Sheets

*Fig. 5*

```
<vmslocations>
  <vmslocation>
    <id>imap-vzwvvm-comverse-branchburg</id>
    <hostport>
        <Host>10.194.46.188</Host>
        <Port>50143</Port>
    </hostport>
    <hostport>
        <Host>10.194.46.187</Host>
        <Port>50143</Port>
    </hostport>
  </vmslocation>
  <vmslocation>
    <id>imap-vzwvvm-comverse-southlake</id>
    <hostport>
        <Host>10.194.46.186</Host>
        <Port>50143</Port>
    </hostport>
<hostport>
        <Host>10.194.46.185</Host>
        <Port>50143</Port>
    </hostport>
<hostport>
        <Host>10.194.46.184</Host>
        <Port>50143</Port>
    </hostport>
<hostport>
        <Host>10.194.46.183</Host>
        <Port>50143</Port>
    </hostport>
  </vmslocation>
  <vmslocation>
    <id>imap-vzwvvm-comverse-southlake1</id>
    <hostport>
        <Host>10.194.46.188</Host>
        <Port>50143</Port>
    </hostport>
    </vmslocation>
<vmslocations>
```

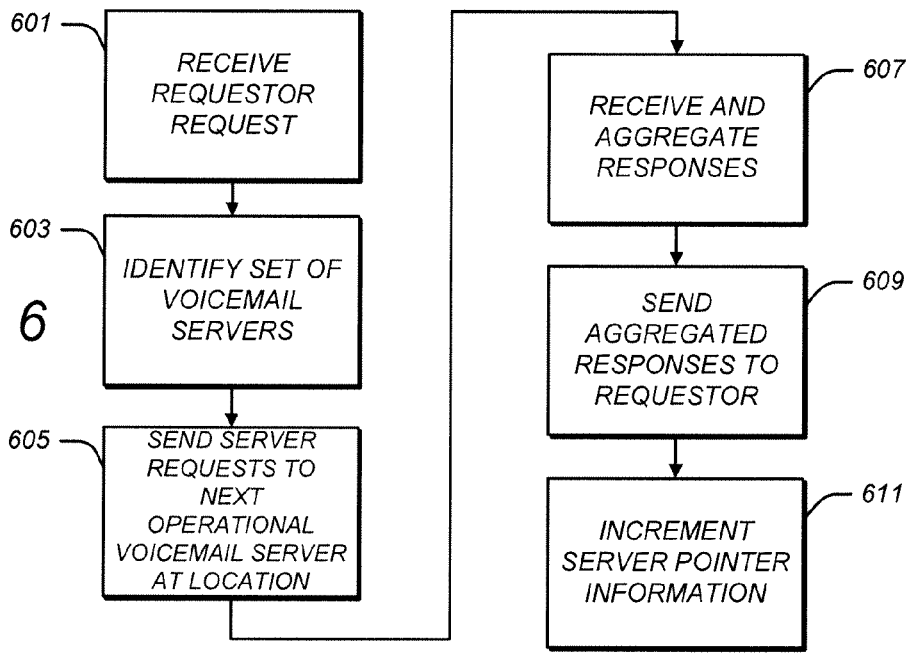

```
<locations>
  <location>
    <id>VZWCVSN2</id>
    <vmslocation>imap-vzwvvm-comverse-branchburg</vmslocation>
    <npanxx>000000</npanxx>
    <mailbox>10</mailbox>
    <rc>R</rc>
    <callflow>N/A</callflow>
    <smdi>N/A</smdi>
  </location>
  <location>
    <id>VZWCVSN1</id>
    <vmslocation>imap-vzwvvm-comverse-southlake</vmslocation>
    <npanxx>000000</npanxx>
    <mailbox>10</mailbox>
    <rc>R</rc>
    <callflow>N/A</callflow>
    <smdi>N/A</smdi>
  </location>
```

LOAD BALANCING VOICEMAIL SERVER SYSTEM

BACKGROUND

1. Technical Field

This disclosure relates to load balancing in data communication systems, including in connection with visual voicemail systems.

2. Description of Related Art

Visual voicemail enables information about audible voicemails to be seen visually, such as header information and voice-to-text translations of the voicemails.

To facilitate this functionality, a system of visual voicemail servers may receive requests for visual voicemail services, such as requests to save, deposit, or delete voicemails and/or for information about voicemails. In turn, this system of visual voicemail servers may issue corresponding requests to a set of voicemail servers that are managing the relevant voicemails, receive responses to these requests, aggregate the responses, and provide the aggregated information back to the sources of the original requests.

To manage a large volume of traffic, requests from the system of visual voicemail servers to voicemail servers at a particular location may be managed by a proxy server. The proxy server may allocate one or more of these requests to a particular voicemail server at the particular location as part of a load balancing process.

The use of such proxy servers to perform load balancing, however, can be costly. They can also limit the control that the system of visual voicemail servers may exercise over the voicemail servers, the ability of the system of visual voicemail servers to become aware of problems with the voicemail servers, and/or the ability of the system of visual voicemail servers to easily expand to accommodate additional voicemail servers.

SUMMARY

A load balancing server system may balance the load imposed by requestor requests for services across a set of service-providing servers that provide those services. A network interface may interface with a network communication system. The network interface may receive the requestor requests from the network communication system and send server requests for services through the network communication system to the service-providing servers. A data processing system may create and maintain server status information indicative of whether each service-providing server is operational, create and maintain server pointer information that identifies the service-providing server to which the next server request should be sent, and receive the requestor requests from the network interface. In response to each requestor request, the data processing system may cause the network interface to send one or more server requests for one or more services related to the requestor request to the service-providing server identified by the server pointer information and increment the server pointer information to the next service-providing server that is indicated as being operational by the server status information in a round-robin manner. A data storage system may store the server status information and the server pointer information.

The data processing system may test each service-providing server to determine whether it is operational and, based on the results of the tests, set the server status information so that it correctly indicates the operational status of each service-providing server. Each test may attempt to establish a connection to the service-providing server. The tested service-providing server may be deemed operational if and only if the connection is established. The data processing system may perform each test as part of an initialization process and/or periodically.

The data processing system may increment the server pointer information to the next service-providing server that is indicated as being operational by the server status information, if a test indicates that the service-providing server currently identified by the server pointer information is no longer operational.

The data storage system may store server identification information that identifies each service-providing server. The data processing system may perform the tests on each service-providing server identified by the server identification information.

Each service-providing server may have an IP address. The server identification information may include the IP address of each service-providing server.

Each service-providing server may have a port to which service requests should be sent. The server identification information may include the port to which the services requests should be sent for each service-providing server.

The load balancing server system may be part of a visual voicemail server system.

The service-providing servers may be voicemail servers. The load balancing server system may be for balancing the load imposed by requestor requests across multiple sets of voicemail servers. Each requestor request may contain server identification information indicative of one of the sets of voicemail servers. The data processing system may, for each set of voicemail servers, create and maintain server pointer information that identifies the voicemail server within the set to which the next server request whose server identification information is indicative of the set should be sent. In response to each requestor request, the data processing system may identify the set of voicemail servers indicated by the server identification information within the requestor request, cause the network interface to send one or more server requests for one or more services relating to the requestor request to the next operational voicemail server identified by the server pointer information for the identified set, and increment the server pointer information for the identified set to the next voicemail server within the set that is indicated as being operational by the server status information in a round-robin manner.

Each set of voicemail servers may be at a different location. The server identification information may be indicative of the location of one of the sets of voicemail servers.

The load balancing server system may be part of a visual voicemail gateway server that provides a gateway to the voicemail servers.

The requestor requests may include a request to save, deposit, or delete one or more voicemails. The data processing system may cause the network interface to send one or more server requests to save, deposit, or delete the one or more voicemails in response to the requestor request.

The requestor requests may include a request for information about one or more voicemails. The data processing system may be configured to cause the network interface to send one or more server requests for the requested information to the operational service-providing server identified by the server pointer information.

The network interface may receive information from the voicemail servers and send information to requestors who send requestor requests. The data processing system may receive the requested information from the network interface in response to the one or more server requests for the requested information and cause the network interface to send the requested information to the requestor that sent the request for the information.

In response to the request for information, the data processing system may cause the network interface to send multiple requests, each for portions of the requested information, to the operational service-providing server identified by the server pointer information, and aggregate the information received in response by the network interface into a single response to the requestor that requested the information.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 5 illustrates an example of a file containing the voicemail server IP addresses and ports illustrated in FIG. 2.

FIG. 6 illustrates an example of the usage process illustrated in FIG. 3.

FIG. 7 illustrates an example of a file containing the voicemail server locations illustrated in FIG. 2.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
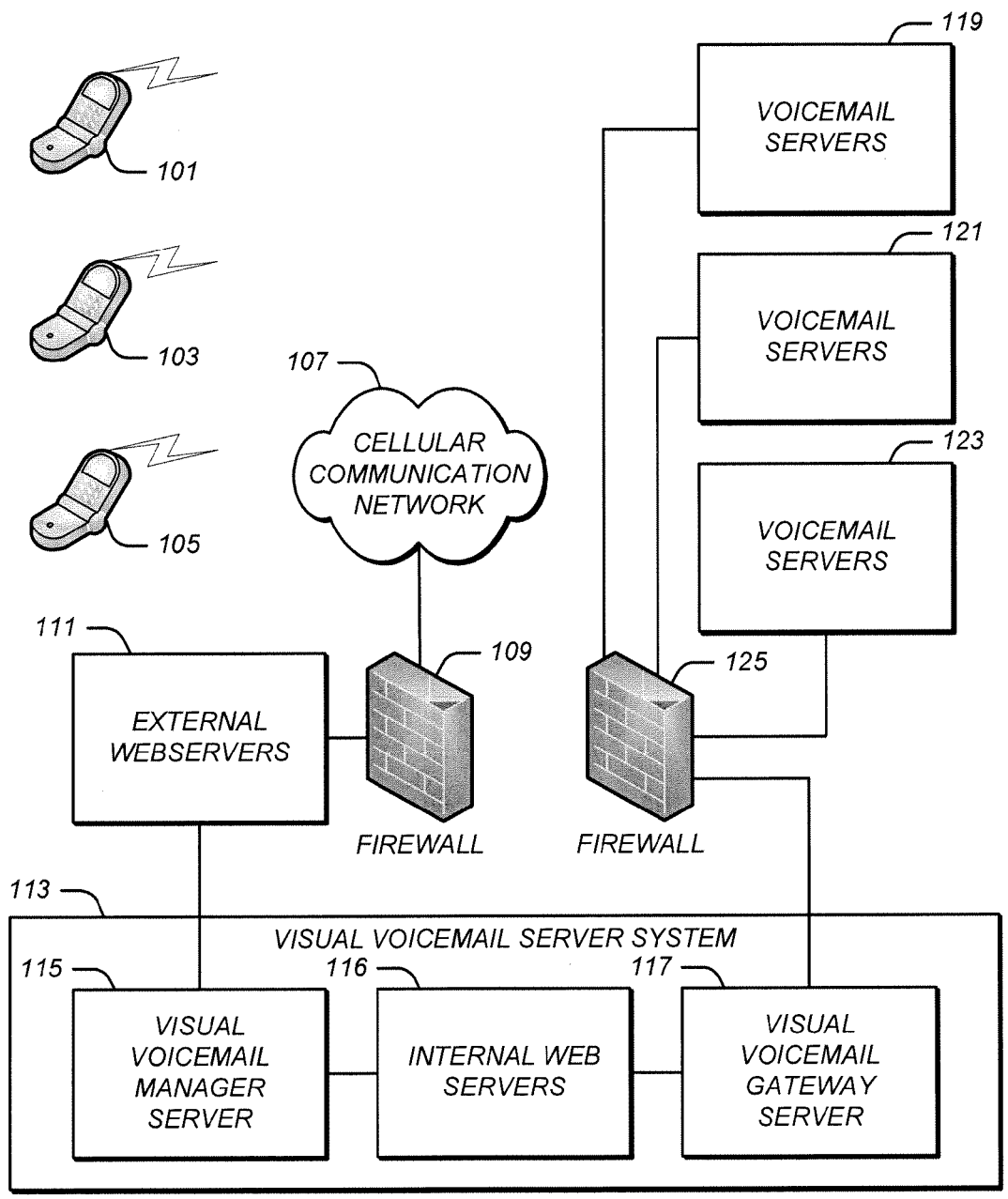
FIG. 1 illustrates an example of a computer network that includes wireless mobile communication devices, a visual voicemail server system, and voicemail servers at different locations.

FIG. 1 illustrates an example of computer network that includes wireless mobile communication devices, a visual voicemail server system, and voicemail servers at different locations.

The wireless mobile communication devices may be of any type. For example, they may be cell phones, such as cell phones 101, 103, and 105. Other examples of the wireless mobile communication devices include laptops, tablets, PDA's, or smart phones.

A cellular communication network 107 may facilitate communications with the wireless mobile communication devices, such as with the cell phones 101, 103, and/or 105. The wireless mobile communication devices may issue requests for visual voicemail services, such as requests to read, save, refresh, deposit, and/or delete one or more voicemails. The requests may in addition or instead seek information about the visual voicemails, such as header information and/or voice-to-text translations.

These requests may be routed by the cellular communication network 107 through a firewall 109 to one or more external web servers 111 that may be configured to distribute these requests to one or more visual voicemail server systems, such as to a visual voicemail server system 113.

The visual voicemail server system 113 may include one or more servers configured to assist in the processing of the requests. For example, the visual voicemail server system 113 includes a visual voicemail manager server 115, which may be configured to manage the processing of each request and to forward the request to a visual voice mail gateway server 117 for any additional details. In particular, an internal web server 116 may be configured to receive each request from the visual voicemail manager server 115 and route the request to an individual voicemail server in sets of visual voicemail servers 119, 121, 123 within the same network. The requests may be routed through the visual voicemail gateway server 117, which may be configured to provide a gateway between the request for services and the individual voicemail server that provide the service. Although only one visual voicemail manager server 115, internal web server 116, and visual voice mail gateway server 117 are shown in FIG. 1 for convenience, multiples of each these servers may be present.

As shown in FIG. 1, numerous sets of voicemail servers, such as sets of voicemail servers 119, 121, and 123, may be exist in the system. Each set of voicemail servers 119, 121, and 123 may be at a different physical location and/or under the management and control of a different entity. The voicemail servers within each set of voicemail servers 119, 121, and 123 may be configured to perform the same or comparable voicemail functions, thereby enabling any voicemail server within a set of the voicemail servers 119, 121, and 123 to satisfy a request for a service that is sent by the visual voicemail gateway server 117.

The visual voicemail gateway server 117 may be configured to generate requests for services to the set of voicemail servers configured to satisfy the requests received from the wireless mobile communication devices. The visual voicemail gateway server 117 may be configured to balance the load imposed by numerous requests for services across the voicemail servers within the set of voicemail servers, so as to enhance overall performance and minimize overloads. Examples of how the visual voicemail gateway server 117 may be configured to provide this functionality are described below in connection with the remaining figures.

Figure 2:
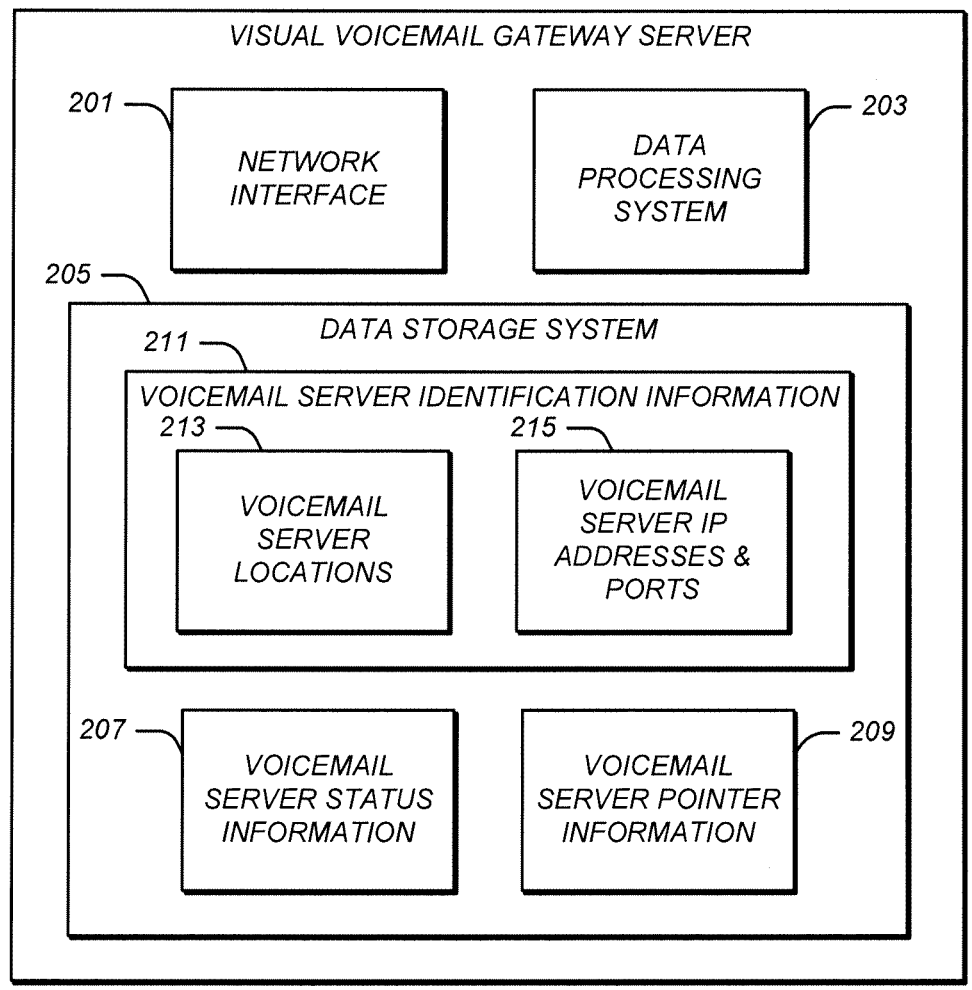
FIG. 2 illustrates an example of the visual voicemail gateway server illustrated in FIG. 1.

FIG. 2 illustrates an example of the visual voicemail gateway server 117 illustrated in FIG. 1. The visual voicemail gateway server 117 illustrated in FIG. 1 may be different from the one illustrated in FIG. 2. Similarly, the visual voicemail gateway server illustrated in FIG. 2 may be used in connection with computer networks that are different from the one illustrated in FIG. 1.

As illustrated in FIG. 2, the visual voicemail gateway server may include a network interface 201, a data processing system 203, and a data storage system 205.

The network interface 201 may be configured to interface with a network communication system in order to receive a request (also referred to herein as requestor requests) from a wireless mobile communication device (also referred to herein as a requestor) from the network communication system, send one or more requests for services (also referred to herein as a server request) through the network communication system to the voicemail servers, to receive information back from the voicemail servers, and to send information to the requestor. The network interface 201 may communication with the visual voicemail manager server 115 through the network communication system to obtain the request from the wireless mobile communication devices.

The data processing system 203 may be configured to create and maintain voicemail server status information 207, which may be stored in the data storage system 205. The voicemail server status information 207 may be indicative of whether each voicemail server, such as each voicemail server within the set of voicemail servers 119, 121, and 123, is operational. Procedures that the data processing system 203 may follow to create and maintain this information are discussed below.

The data processing system 203 may be configured to create and maintain voicemail server pointer information 209, which may be stored in the data storage system 205. The voicemail server pointer information 209 may identify the voicemail server within each set of voicemail servers to which the next server request for a service from that set of voicemail servers should be sent. Examples of procedures that the data processing system 203 may follow to accomplish this are discussed below.

The data processing system 203 may be configured to receive each requestor request from the network interface 201. In response, the data processing system 203 may be configured to cause the network interface 201 to send one or more server requests for one or more services related to the requestor request. The server requests are sent to the voicemail server identified by the server pointer information relating to the set of voicemail servers to which the requestor request is directed. Thereafter, the data processing system 203 may be configured to increment the voicemail server pointer information 209 to the next operational voicemail server within the voicemail set. The next operational voicemail server is indicated as being operational by the voicemail server status information relating to that set in a round-robin manner. The phrase "round-robin manner" means that the server pointer is incremented to sequentially point to each different operational voicemail server in a set until all of the operational voicemail servers have been given a turn, following which the pointer returns to the first operational voicemail server in the set and the process repeats. Voicemail servers in a set that are not operational at the time the pointer is incremented, as indicated by the voicemail server status information 207, may be skipped and not designated to receive any server requests.

The data processing system 203 may be configured to receive the information requested from a particular voicemail server from the network interface 201 in response to one or more server requests for that information. The data processing system 203 may be configured to cause the network interface 201 to send this received information to the requesting wireless mobile communication device that originally sent the request for information. The information received from the particular voicemail server may be aggregated before it is sent to the requestor through the network interface 201. This is to say that when a gateway server receives a request, it performs sequence of operations on the voicemail server. These operations may include connecting, logging to the inbox, and then performing the desired actions, which may in turn include retrieving message headers, deleting the message, saving the message, etc. For each of these operations, the gateway server may receive a response and, based on the response, may trigger subsequent actions. For some requests, like delete mail or save mail or deposit, multiple message IDs may exist, on each of which these operations are to be performed. In such a case, the gateway server may receive a response for each of the message IDs and then aggregate the responses into one combined response and send the combined response back to the network element.

The data processing system 203 may include one or more processors, memory devices (e.g., random access memories (RAMS), read-only memories (ROMS), and/or programmable read-only memories (PROMS)), and/or user interface devices (e.g., keyboards, pointing devices, displays, microphones, sound reproduction systems and/or touch screens). The data processing system 203 may be at a single physical location or distributed across multiple locations.

The data storage system 205 may be configured to store voicemail server identification information that identifies each voicemail server, such as each voicemail server that is contained within each set of the voicemail servers 119, 121, and/or 123. The voicemail server identification information 211 may include voicemail server locations 213 and/or voicemail server IP addresses and ports 215. Examples of these are described below.

The data storage system 205 may include one or more memory devices, e.g., random access memories (RAMS), read-only memories (ROMS), programmable read-only memories (PROMS), hard disc drives, CD/DVD drives, and/or flash memories.

Figure 3:
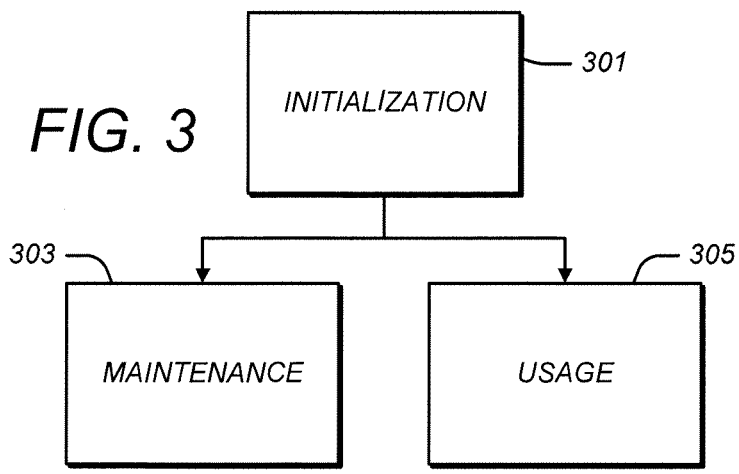
FIG. 3 illustrates an example of processes that may take place in the visual voicemail gateway server illustrated in FIG. 2.

FIG. 3 illustrates an example of processes that may take place in the visual voicemail gateway server illustrated in FIG. 2. The visual voicemail gateway server illustrated in FIG. 2 may perform processes that are different from and/or in addition to the processes illustrated in FIG. 3. Similarly, the processes illustrated in FIG. 3 may be performed by visual voicemail gateway servers different from the one illustrated in FIG. 2.

As illustrated in FIG. 3, the process may include an initialization process 301 followed by a maintenance process 303 and a usage process 305. The maintenance process 303 and the usage process 305 may be performed at the same time or in interlaced time-spliced cycles. The initialization process 301 may be triggered when the gateway server is initially started and when the gateway server is restarted.

Figure 4:
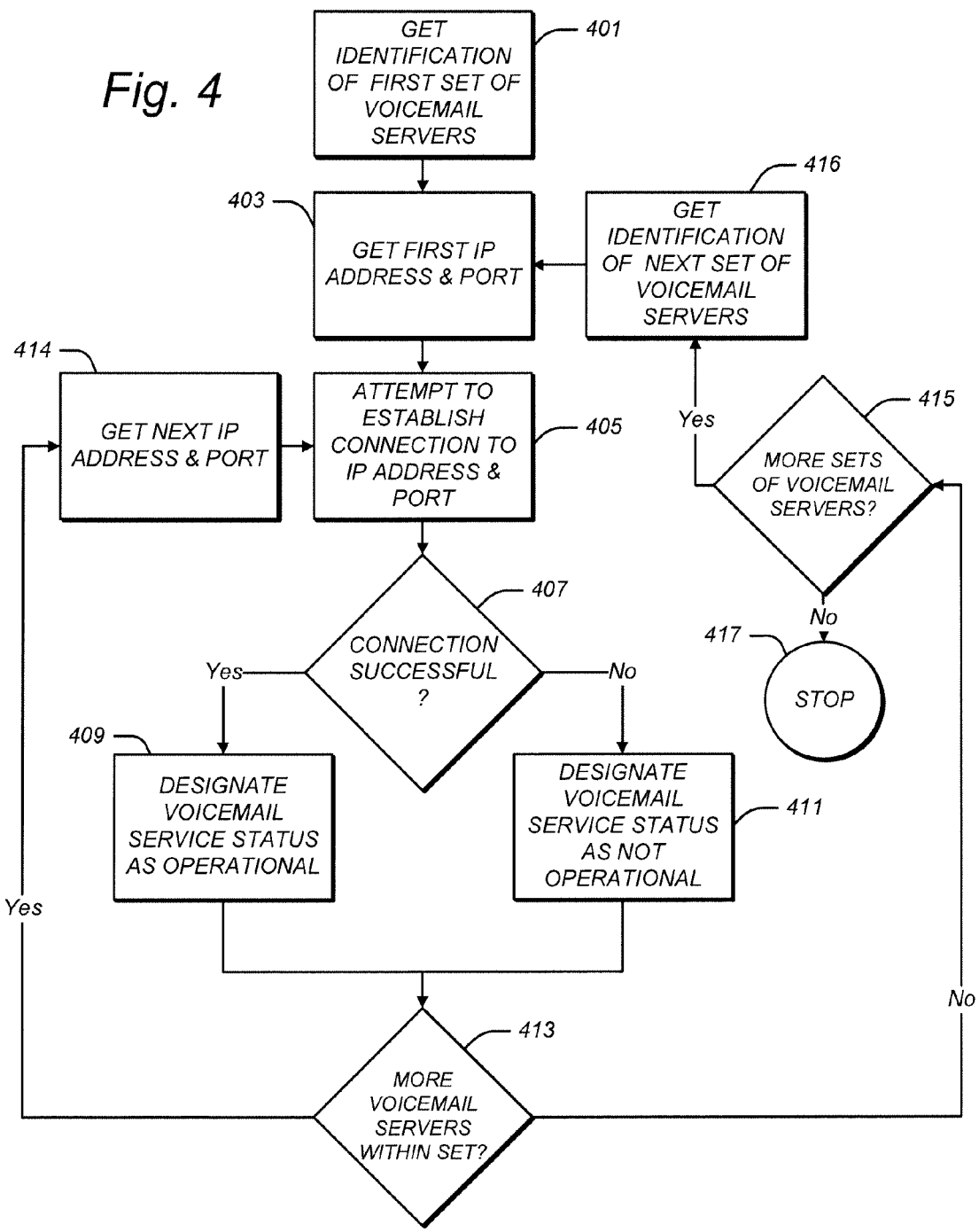
FIG. 4 illustrates an example of the initialization process illustrated in FIG. 3.

FIG. 4 illustrates an example of the initialization process 301 illustrated in FIG. 3. The initialization process 301 illustrated in FIG. 3 may be different from the one illustrated in FIG. 4. Similarly, the initialization process 301 illustrated in FIG. 4 may be used in connection with a process that is different than the one illustrated in FIG. 3.

The initialization process 301 may begin by getting an identification of the first set of voicemail servers that are being load balanced by the visual voicemail gateway server 117, as illustrated by a Get Identification of First Set of Voicemail Servers step 401. During this step, the data processing system 203 may examine the voicemail server IP addresses and ports 215 in the data storage system 205. The voicemail server IP addresses and ports 215 may contain information identifying each set of voicemail servers.

Once a set of voicemail servers is identified, the data processing system 203 may obtain the IP address and request access port of the first server in that set, as reflected by a Get First IP Address & Port step 403. During this step, the data processing system 203 may again access the voicemail server IP addresses and ports 215.

The voicemail server IP addresses and ports 215 illustrated in FIG. 2 may be in any format. FIG. 5 illustrates an example of a file containing the voicemail server IP addresses and ports. This file may be in any format. For example, it may be in the format of an XML file, as illustrated in FIG. 5. As illustrated in FIG. 5, the XML file may specify the name of each location at which there are a set of voicemail servers, such as "imap-vzwvvm-comverse-branchburg" on line three of the file. For each specified location, the IP address and access port of each server within the set may be specified, such as the IP address 10.194.46.188 and the corresponding port of 50143 on lines five and six of FIG. 5, respectively.

As part of the initialization process, the visual voicemail gateway server may next attempt to establish a connection with the voicemail server at the IP address and through the port which was obtained in step 403, as established by Attempt to Establish Connection to IP Address and Port step 405. During this step, the data processing system 203 may cause the network interface 201 to use an IMAP/SMTP protocol-formatted message to establish a connection with the voice mail server. The success of this effort may be tested, as reflected by a Connection Successful? decision step 407. To test the connection, an attempt is made to open a socket connection to the given voice mail server host and port.

If the connection is successful, the visual voicemail gateway server may designate the voicemail server status of this particular voicemail server as operational, as reflected by a Designate Voicemail Server Status as Operational Step 409. During this step, the data processing system 203 may set the voicemail server status information 207 for the particular voicemail server as indicating that the particular voicemail server is operational. If the connection is not successful (e.g., an exception occurs during the creation of the connection), on the other hand, the visual voicemail gateway server may designate the voicemail server status of the particular voicemail server as not operational, as reflected by a Designate Voicemail Server Status as Not Operational step 411. During this step, the data processing system 203 may cause the voicemail server status information 207 for the particular voicemail server to indicate that the particular voicemail server is not operational. Also during this step, notification of the non-operational server may be given to repair or other personnel, such as by utilizing SNMP.

Thereafter, the data processing system 203 may check the voicemail server identification information 211 to determine whether there are any more voicemail servers within the current set of voicemail servers to be tested, as reflected by a More Voicemail Servers Within Set? decision step 413. If so, the data processing system 203 may obtain the next IP address and port from the voicemail server IP addresses and ports 215, as reflected by a Get Next IP Address & Port step 414. The process of testing each voicemail server within this set and setting its operational status within the voicemail server status information 207 may continue, as described above, until there are no more untested voicemail servers within the set.

When all of the voicemail servers within a set have been tested, the initialization process may determine whether there are any more sets of voicemail servers to be tested, as reflected by a More Sets of Voicemail Servers? decision step 415. During this step, the data processing system 203 may again consult the voicemail server IP addresses and ports 215 to determine whether there are any more sets of untested voicemail servers. If so, the data processing system 203 may get the identification of the next set of voicemail servers, as reflected by a Get Identification of Next Set of Voicemail Servers step 416. During this step, the data processing system 203 may again access this information from the voicemail server IP addresses and ports 215.

Once all of the voicemail servers within all of the sets of voicemail servers have been tested, the initialization process may stop, as reflected by a Stop step 417.

The maintenance process 303 illustrated in FIG. 3 may be the same as the initialization process 301, an example of which is set forth in FIG. 4 and discussed above. However, the maintenance process 303 may contain different steps. For example, the maintenance process 303 may not be part of the initiation process of the visual voicemail gateway server. Rather, the maintenance process 303 may take place after the initialization process 301 and on a repeated basis, such as on a periodic basis. For example, the maintenance process 303 may take place at 1, 5, 10, or 20 minute intervals after the initialization process. The maintenance process 303 may also only update those portions of the voicemail server status information 207 that are no longer accurate, based on the tests run during the maintenance process 303, rather than initialize or overwrite the information for every voicemail server.

FIG. 6 illustrates an example of the usage process illustrated in FIG. 3. The usage process 305 illustrated in FIG. 3 may be different from the one illustrated in FIG. 6. Similarly, the usage process illustrated in FIG. 6 may be used in connection with processes other than the one illustrated in FIG. 3.

During the usage of the visual voicemail gateway server, a requestor request for the services of a voicemail server may be received, as reflected by a Received Requestor Request step 601. The services which are requested may be of any type, such as to read, save, refresh, deposit, and/or delete one or more voicemails and/or to receive visual information about the voicemails, such as header information and/or voice-to-text translations. The requestor request may come from any source, such as from a subscriber to the cellular communication network 107 who may be operating a wireless mobile communication device, such as the cell phone 101, 103, or 105. The requestor request may be received, for example, by the network interface 201.

The requestor request may contain information identifying a set of voicemail servers. This identification may be in the form of a code. The visual voicemail gateway server may determine the identity of the set of voicemail servers from this information, as reflected by a Determine Location of Voicemail Servers step 603. During this step, the data processing system 203 may consult the voicemail server locations 213 to obtain the identity of the set of voicemail servers indicated by the code in the request.

FIG. 7 illustrates an example of a file containing the voicemail server locations illustrated in FIG. 2. As illustrated in FIG. 7, an XML file may be used to map each identification code to the location of each voicemail server set, such as to map the voicemail server set code "VZWCVSN2" to the location "imap-vzwvvm-comverse-branchburg." Thus, the data processing system 203 may search through the voicemail server locations 213 until it finds the code in the requestor request. It may then extract the needed location information.

The data processing system 203 may cause the network interface 201 to send one or more server requests for one or more services relating to the requestor request from the wireless mobile communication devices to the next operational voicemail server identified by the server pointer information for the identified set of servers, as reflected by a Send Server Requests to Next Operational Voicemail Server at Location step 605. During this step, the data processing system 203 may access the voicemail server pointer information 209 to obtain the identity of the voicemail server at the identified location. The data processing system 203 may then formulate one or more server requests for providing the services that are the subject of the requestor request. Several separate server requests may be sent to the voicemail server to fulfill one or more different types of requestor requests. For example, when a wireless mobile communication device triggers a listmail request to the data processing system, the data processing system may trigger a sequence of service requests to one or more voicemail servers to perform the following activities:

1) Connect to the respective voice mail server
2) Open the inbox of the customer using customer credentials
3) Get quota information
4) Get messages
5) Fetch profiles and headers for all messages The data processing system 203 may receive the response to each server request from the network interface 201. When a particular requestor request triggers multiple server requests (and thus there are multiple responses to the requestor request), the data processing system 203 may aggregate the responses, as reflected by a Receive and Aggregate Responses step 607.

The data processing system 203 may then cause the network interface 201 to send the received information (which may be aggregated) to the requestor, as reflected by a Send Aggregated Responses to Requestor step 609.

The data processing system 203 may then increment the server pointer information for the identified set of voicemail servers to the next operational voicemail server within the set using the voicemail server status information 207 in a round-robin manner, as indicated by an Increment Server Pointer Information step 611. Voicemail servers indicated in the Voicemail Server Status Information 207 as not being operational may be skipped.

Unless otherwise indicated, each of the servers in the visual voicemail server system 113 and each of the voicemail servers in the sets of voicemail servers 119, 121, and 123 that have been discussed herein may each be implemented with a computer system configured to perform the functions which have been described herein for the component. Each computer system may include one or more computers at the same or different locations. When at different locations, the computers may be configured to communicate with one another through a wired and/or wireless network communication system. Each computer may include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens). Each computer may include software (e.g., one or more operating systems, device drivers, application programs, and/or communication programs), which may be configured when executed to cause the computer to perform one or more of the functions which have been described herein for the computer system. The software may include programming instructions and associated data and libraries. The software may implement one or more algorithms which may cause the computer to perform each function. The software may be stored on one or more tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages which have been discussed are merely illustrative. None of them, nor the discussions relating to them, are intended to limit the scope of protection in any way. Other embodiments contemplated include those that have fewer, additional, and/or different components, steps, features, objects, benefits and advantages, as well as those in which the components and/or steps are arranged and/or ordered differently.

For example, the load balancing apparatus and procedures which have been discussed may be used in connection with any type of service-providing servers, not merely voicemail servers.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

The invention claimed is:

1. A load balancing server system for balancing a load imposed by requestor requests, the load balancing server system comprising:
   a network interface configured to interface with a network communication system to:
      receive the requestor requests from the network communication system; and
      send server requests for services through the network communication system to service-providing servers;
   a data processing system configured to:
      create and maintain server status information indicative of whether each service-providing server is operational;
      create and maintain server pointer information that identifies the service-providing server to which the next server request should be sent; and
      receive the requestor requests from the network interface and, in response to each:
         cause the network interface to send, to the service-providing server identified by the server pointer information, one or more server requests for one or more services related to the requestor request; and increment, in a round-robin manner, the server pointer information to the next service-providing server indicated as being operational by the server status information; and a data storage system configured to store the server status information and the server pointer information.

2. The load balancing server system of claim 1 wherein the data processing system is further configured to:

test each service-providing server to determine whether the service-providing server is operational; and based on the results of the tests, set the server status information so that the server status information correctly indicates the operational status of each service-providing server.

3. The load balancing server system of claim 2 wherein:

each test attempts to establish a connection to the service-providing server; and the tested service-providing server is deemed operational only if the connection is established.

4. The load balancing server system of claim 2 wherein the data processing system is further configured to perform each test as part of an initialization process.

5. The load balancing server system of claim 2 wherein the data processing system is further configured to perform each test periodically.

6. The load balancing server system of claim 4 wherein the data processing system is further configured to increment the server pointer information to the next service-providing server indicated as being operational by the server status information, if one of the tests indicates that the service-providing server currently identified by the server pointer information is no longer operational.

7. The load balancing server system of claim 2 wherein:

the data storage system is further configured to store server identification information that identifies each service-providing server; and the data processing system is further configured to perform the tests on each service-providing server identified by the server identification information.

8. The load balancing server system of claim 7 wherein:

each service-providing server has an IP address; and the server identification information includes the IP address of each service-providing server.

9. The load balancing server system of claim 8 wherein:

each service-providing server has a port to which the service requests are to be sent; and the server identification information includes the port for each service-providing server.

10. The load balancing server system of claim 1 wherein the load balancing server system is part of a visual voicemail server system.

11. The load balancing server system of claim 10 wherein the service-providing servers are voicemail servers.

12. The load balancing server system of claim 10 wherein:

the load balancing server system is configured to balance the load imposed by the requestor requests across multiple sets of voicemail servers;

each requestor request contains server identification information indicative of one of the sets of voicemail servers; and the data processing system is further configured to:

for each set of voicemail servers, create and maintain server pointer information that identifies the voicemail server within the set to which the next server request, whose server identification information is indicative of the set, should be sent; and in response to each requestor request:

identify the set of voicemail servers indicated by the server identification information within the requestor request;

cause the network interface to send, to the next operational voicemail server identified by the server pointer information for the identified set, one or more server requests for one or more services relating to the requestor request; and increment, in a round-robin manner, the server pointer information for the identified set to the next voicemail server within the set indicated as being operational by the server status information.

13. The load balancing server system of claim 11 wherein:

each set of voicemail servers is disposed at a different physical location; and the server identification information indicates the physical location of one of the sets of voicemail servers.

14. The load balancing server system of claim 11 wherein the load balancing server system is part of a visual voicemail gateway server that provides a gateway to the voicemail servers.

15. The load balancing server system of claim 10 wherein:

the requestor requests include a request to save, deposit, or delete one or more voicemails; and the data processing system is configured to cause the network interface to send one or more server requests to save, deposit, or delete the one or more voicemails in response to the requestor request.

16. The load balancing server system of claim 10 wherein:

the requestor requests include a request for information about one or more voicemails; and the data processing system is further configured to cause the network interface to send one or more server requests for the requested information to the operational service-providing server identified by the server pointer information.

17. The load balancing server system of claim 16 wherein:

the network interface is further configured to:

receive the requested information from voicemail servers; and send the requested information to requestors who sent the requestor request for the requested information; and the data processing system is further configured to:

receive the requested information from the network interface in response to the one or more server requests for the requested information; and cause the network interface to send the requested information to the requestor who sent the request for the requested information.

18. The load balancing server system of claim 17 wherein, in response to the requested information, the data processing system is configured to:

cause the network interface to send multiple server requests, each for portion of the requested information, to the operational service-providing server identified by the server pointer information; and aggregate the information received in response to the multiple server requests by the network interface into a single response to the requestor which requested the information.

19. A load balancing server system for balancing, across a set of voicemail servers, a load imposed by requestor requests for services provided by the voicemail servers, the load balancing server system comprising a data processing system configured to:

create and maintain server status information indicative of whether each voicemail server is operational;

create and maintain server pointer information that identifies the voicemail server to which a next server request is to be sent; and increment the server pointer information after each server request such that the load imposed by the requestor requests is able to be balanced.

20. A visual voicemail gateway server for providing a gateway between requestor requests for visual voicemail services and multiple sets of voicemail servers that provide voicemail services related to the visual voicemail services which are requested, the visual voicemail gateway server comprising:

a network interface configured to interface with a network communication system to:

receive the requestor requests from the network communication system;

send server requests for the voicemail services through the network communication system to the voicemail servers;

receive from the voicemail servers information in response to the server requests; and send responses, based on the received information, to the requestor requests to requestors from which the requestor requests originated; and a data processing system configured to balance a load imposed by the requestor requests across the multiple sets of voicemail servers and to cause the network interface to send the responses.

* * * * *